R. M. LAFFERTY.
Assignor to Smith & Lafferty.
No. 7,677. PUMP. Reissued May 15, 1877
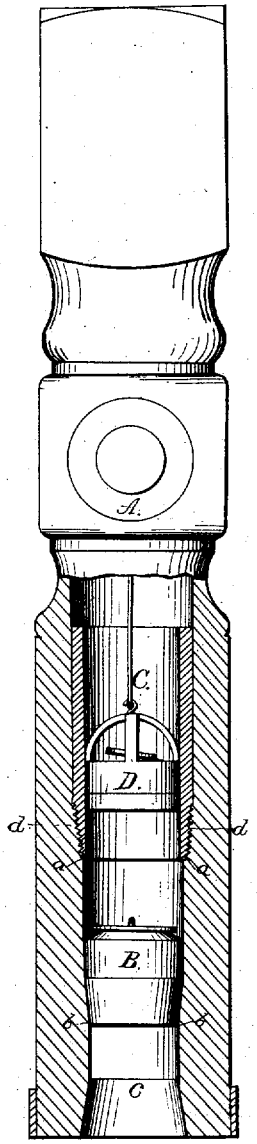
Attest:
R. T. Dyer.
S. M. Seely.
Inventor:
Robert M. Lafferty
by Geo. W. Dyer & Co.
attys.
N. PETERS, PHOTO-LITHOGRAPHER, WASHINGTON, D. C.

UNITED STATES PATENT OFFICE

ROBERT M. LAFFERTY, OF TOLEDO, OHIO, ASSIGNOR TO SMITH & LAFFERTY.

IMPROVEMENT IN PUMPS.

Specification forming part of Letters Patent No. 127,173, dated May 28, 1872; reissue No. 7,677, dated May 15, 1877; application filed January 21, 1873.

DIVISION B.

*To all whom it may concern:*

Be it known that I, ROBERT M. LAFFERTY, of Toledo, in the county of Lucas and State of Ohio, have invented a new and useful Improvement in Wood Pumps; and I do hereby declare that the following is a true and accurate description thereof, reference being had to the accompanying drawing, forming a part of this specification, in which my pump is shown in elevation, with the lower part thereof in section.

The object of my invention is to provide the bore of a wood pump with a metallic cylinder, to receive the wear of the plunger, which will be much less expensive than those heretofore used, and will allow a wood joint to be made between the pump-stock and the wood tubing, thus forming a more durable and more efficient pump, and, at the same time, one which can be manufactured at a less cost than heretofore.

My invention therein consists mainly in introducing into the pump-stock from the top a short metallic cylinder, with an equal interior bore, the said cylinder neither carrying the check-valve nor extending down to the check-valve seat; second, in securing such peculiar short cylinder in the stock by a screw-thread; and, further, in the combination of such cylinder and the peculiar pump-stock, all as more fully hereinafter explained.

In the drawings, A represents the wooden stock or barrel of my pump, whose interior is bored of larger size above the point or shoulder *a* than below it. Below this shoulder the bore is contracted at *b*, its narrowest point, to form a seat for the check-valve B. The lower end of the wooden stock is enlarged, as shown by *c*, to receive the taper end of the wood pipe or tubing through which the water is drawn from the well. C is a short metallic cylinder or section of tubing, whose lower end *d* is screw-threaded, as shown. This cylinder is of the same interior diameter throughout its length, is introduced into the bore of the pump from the top, and is turned into position by means of an expanding wrench, or other equivalent device, its lower end striking against the shoulder *a*, which is somewhat above the seat for the check-valve. This cylinder is for the purpose of taking the wear of the plunger D, which reciprocates therein with little friction.

It will be seen that, by having the metallic cylinder or lining short in length, or about the same length as the stroke of the plunger —in practice it is generally a little longer—a great saving is made in the weight of the metal required for the cylinder over those heretofore constructed, which have generally been inserted from the bottom of the pump-stock, and extend from the lower end of such pump-stock to the upper limit of the stroke of the plunger. This short cylinder performs the same functions as one of greater length, or as a metallic lining extending the entire height of the pump-stock, and, as will be readily understood, is not so expensive. By having the short cylinder inserted into the bore of the pump-stock from the top, the bore may be made smaller below such cylinder, and a seat for the check-valve formed in the pump-stock without the expense of cutting one in the metallic cylinder, and the bore, being larger above the check-valve seat, the check-valve can be easily withdrawn through the top of the pump-stock without disturbing the metallic cylinder. My short cylinder also allows a wood joint to be made at the bottom of the pump-stock with the wood tubing leading into the well. In pumps having the metallic cylinder inserted at the bottom the wood tubing and metallic cylinder are united to form the joint. With such construction, however, the pump-stock swells away from the metallic cylinder, and allows the water to run down on the outside of the same, thus making a leaky joint, while, with the wood joint, the stock and tubing swell correspondingly, and always preserve a water-tight connection.

The screw-thread cut on the lower end of my short cylinder strikes into the wood, and prevents the cylinder from becoming loose when the pump-stock swells.

I am well aware that it is not original with me to insert a short metallic lining into the bore of a wood pump from the top; but such linings have heretofore been constructed to carry the check-valves, and were not of the same interior diameter throughout, being more costly in construction than my cylinder, owing partly to the increased weight and to the special provisions required for the check-valve.

I am also aware that wood pumps have heretofore been lined throughout the length of their bore with a soft-metal lining forced in at the top of the stock; but it will be readily seen that this is much more expensive than my short cylinder, would make an insecure joint with the wood tubing, and would become loose by the swelling of the pump-stock.

Having thus fully described my invention, and explained some of its advantages, what I claim as new, and desire to secure by Letters Patent, is—

1. In a wood pump, the combination, with the stock A, of the short metallic cylinder C, whose interior diameter is the same throughout its length, inserted into the bore of the stock from the top, and not extending down to the check-valve seat, substantially as and and for the purposes set forth.

2. In a wood pump, the combination, with the stock A, having the upper part of its bore enlarged, of the short metallic cylinder C, inserted from the top of the stock, and held therein by a screw-thread, substantially as and for the purposes set forth.

3. The combination, with the stock A of a wood pump, of the short screw-threaded metallic cylinder C, inserted from the top of said stock, the contraction *b* in the bore of the pump below such cylinder, and the enlarged opening *c* to form a wood joint with the tubing, substantially as described.

ROBERT M. LAFFERTY.

Witnesses:
THOS. S. SPRAGUE,
H. S. SPRAGUE.